INVENTORS
Lawrence B. Haig,
Robert J. Moffat,
James R. Mondt &
BY Paul T. Vickers Paul Fitzpatrick
ATTORNEY

United States Patent Office 3,282,329
Patented Nov. 1, 1966

3,282,329
REGENERATOR MATRIX
Laurence B. Haig, Berea, Ohio, Robert J. Moffat, Palo Alto, Calif., and James R. Mondt, Warren, and Paul T. Vickers, Royal Oak, Mich., assignors to General Motors Corporation, Detroit, Mich., a corporation of Delaware
Filed Aug. 26, 1964, Ser. No. 392,183
6 Claims. (Cl. 165—8)

Our invention relates to rotary regenerators, and particularly to the structure of a rotary radial-flow, or drum, matrix. Such regenerators are well known, being used to transfer heat from one gas stream to another as, for example, from the exhaust of a gas turbine engine to the compressed air entering the combustion chambers of the engine.

Our invention relates particularly to structure which defines what might be termed the framework of the matrix which carries the porous heat transfer material. The objects of the invention are to facilitate the assembly of the regenerator matrix and provide a strong and reliable structure. The nature of the invention will be apparent from the succeeding detailed description of the preferred embodiment of the invention and the accompanying drawings.

Figure 1:
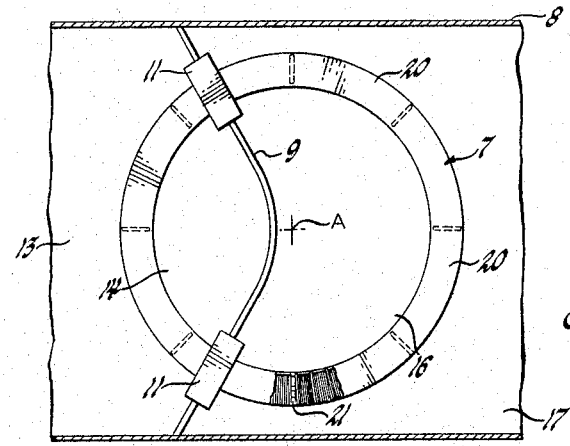
FIGURE 1 is a schematic view of a regenerator embodying the invention with parts cut away, the view being taken on a plane perpendicular to the axis of rotation.

Referring to FIGURE 1, the regenerator matrix 7 is mounted within a housing 8 for rotation about an axis A. A diaphragm 9 divides the interior of the housing into two chambers through which the matrix rotates. Main seals 11 seal around the matrix where it passes through the diaphragm. In the use of the device in a gas turbine engine, for example, air delivered by the engine compressor into a space 13 flows through the smaller sector of the matrix into a space 14, then through the combustion apparatus and turbine (not shown) into a space 16, whence it flows outwardly through the matrix to an exhaust 17.

Figure 2:
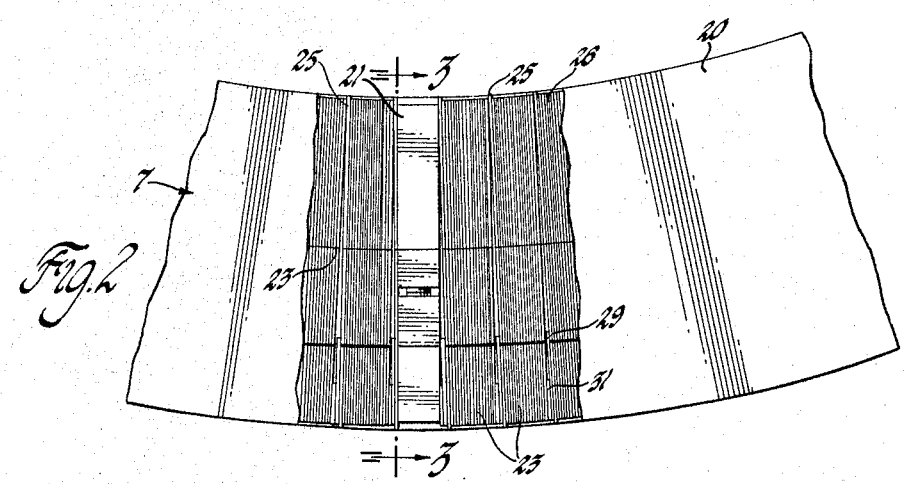
FIGURE 2 is a partial view similar to FIGURE 1 but to a much larger scale.
Figure 3:
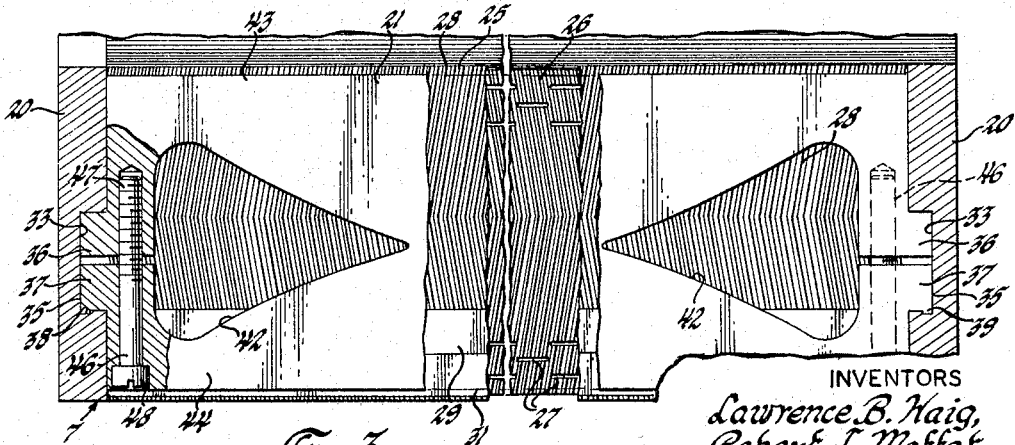
FIGURE 3 is a cross-section of the matrix taken on the plane indicated by the line 3—3 in FIGURE 2, with parts cut away.

Referring to FIGURES 2 and 3, the matrix includes a main framework consisting of two rims 20, one at each end of the matrix, and a number of spacers or stiffeners 21, each of which extends between and is connected rigidly to the rings. The spacers 21 are substantially evenly distributed around the circumference of the matrix, providing a number of compartments which are filled with a laminar heat transfer pack or core which may be made up of corrugated sheets. The heat transfer pack comprises a number of sections or units 23 between each pair of stiffeners. Each unit 23 comprises a seal element 25 and a number of laminae 26. The laminae 26 are very thin sheet metal which is corrugated in a herringbone pattern as shown in FIGURE 3 and which may have small slots 27 adjacent the inner and outer sides. Each seal element 25 includes a herringbone corrugated sheet 28 similar to laminae 26 except that it is imperforate and is slightly wider so that the edges project beyond those of the sheets 26. It also includes a stiffening structure comprising a strip 29 welded or brazed along one edge of the labyrinth element and a narrower strip 31 welded to the surface of the strip 29. These strips act to prevent distortion of the sealing plates 25 and also take up space toward the outer diameter of the matrix so that the greater circumference at the outer edge is filled. The sheets 26 and 28 have projections or tabs on the ends which fit into slots or recesses 33 in the inner faces of the rims.

Each spacer 21 comprises a generally rectangular body which is forked or bifurcated at each end and has a split tenon 35 at each end, each tenon including fingers 36 and 37. The slot 33 is of dovetail configuration by virtue of a recess 38 along its outer side. The finger 35 bears a lug 39 which enters the recess 38. In the assembled condition of the structure, the fingers 36 and 37 are spaced apart to fill the slots 33, and the lugs 39 engaging in the recesses 38 interlock the stiffener with the rim so that they cannot come apart. The fingers are constantly biased apart by elastic strain of the spacer. It will be noted that the fingers 36 and 37 are separated by a tapering cut-out 42 in the body of the spacer.

The cut-out 42 is of such configuration as to provide equalization of the elastic loading in the arms 43 and 44 on each side of the cut-out extending to the fingers 36 and 37. The shape of the cut-out in the spacer is chosen to obtain a specific beam geometry for the fingers. The desired beam geometry allows large deflection of the spacer fingers for a given allowable maximum elastic stress limit. This large deflection is necessary for assembly with lugs which are large enough to properly retain the spacer. The concept here is that the maximum fiber stress in the finger is uniform from end to end of the finger under a load tending to spring the fingers together or apart. The actual contour of the cut-out can readily be calculated to realize this uniform stress distribution to a close degree of approximation. The depth of the finger will ideally vary as the square root of the distance from the end.

Preferably, the spacer includes means to pull the fingers together so that the tenon can be easily inserted into or removed from the slot 33. This may be provided by a machine screw 46 freely mounted in a bore in the outer finger and threaded at 47 into the inner finger, with a head 48 bearing against the outer finger. It will be apparent, however, that the installation could be made by the use of a special compressing tool if desired. It would also be possible to use a screw or the like to spread the fingers for the locking engagement of the spacers with the rims, but this might lead to fretting and wear, which would be undesirable.

In the assembly of the device, the heat transfer material is stacked between the spacers. By virtue of this invention, the spacers may be fitted at any point of the circumference. This makes it possible to accommodate the distance between spacers to the actual space taken by a number of units 23 of heat exchange material. Only at the installation of the final pack of heat exchange material around the entire circumference will any problem of stack-up tolerances arise. Therefore, the total stack-up of the entire circumference may be varied by the thickness of one element 26 or even the difference between such an element and a suitable shim. With the spacers fixed in definite predetermined positions, the problem arises in each section of exactly filling the available space.

The advantages just described of making the assembly, the ease with which the spacers themselves are installed, and the secure connection between the spacers and the rims are all advantages of the invention.

The description of the preferred embodiment of the invention for the purpose of explaining the principles thereof is not to be considered as restricting the invention, which may be modified by the exercise of skill in the art.

We claim:
1. A rotary regenerator matrix of the radial-flow type comprising annular coaxial mutually spaced rims, a plu- ral number of spacers extending between and connected to the rims, the spacers being distributed around the circumference of the rims to provide a rigid structural connection between the rims and define with the rims heat transfer cells, and heat transfer material porous to flow of fluid in a radial direction through the material mounted in the said cells, characterized by rim and spacer structure in which end faces of the spacers bear against the inner faces of the rims, the rims have circumferential dovetail slots in their inner faces, the ends of the spacers bear dovetail tenons engageable in the said slots, the ends of the spacers are bifurcated so that the tenons are variable in width for insertion into the slots and to lock within the dovetail slots, and means effective to vary the width of the tenons.

2. A rotary regenerator matrix of the radial-flow type comprising annular coaxial mutually spaced rims, a plural number of spacers extending between and connected to the rims, the spacers being distributed around the circumference of the rims to provide a rigid structural connection between the rims and define with the rims heat transfer cells, and heat transfer material porous to flow of fluid in a radial direction through the material mounted in the said cells, characterized by rim and spacer structure in which end faces of the spacers bear against the inner faces of the rims, the rims have circumferential dovetail slots in their inner faces, the ends of the spacers bear dovetail tenons engageable in the said slots, and the ends of the spacers are bifurcated so that the tenons are reducible for insertion into the slots and are elastically expanded to lock within the dovetail slots.

3. A rotary regenerator matrix of the radial-flow type comprising annular coaxial mutually spaced rims, a plural number of spacers extending between and connected to the rims, the spacers being distributed around the circumference of the rims to provide a rigid structural connection between the rims and define with the rims heat transfer cells, and heat transfer material porous to flow of fluid in a radial direction through the material mounted in the said cells, characterized by rim and spacer structure in which end faces of the spacers bear against the inner faces of the rims, the rims have circumferential dovetail slots in their inner faces, the ends of the spacers bear dovetail tenons engageable in the said slots, the ends of the spacers are bifurcated so that the tenons are reducible for insertion into the slots and are elastically expanded to lock within the dovetail slots, and screw means on the ends of the spacer effective to draw the furcations together and thus vary the width of the tenons.

4. A rotary regenerator matrix of the radial-flow type comprising annular coaxial mutually spaced rims, a plural number of spacers extending between and connected to the rims, the spacers being distributed around the circumference of the rims to provide a rigid structural connection between the rims and define with the rims heat transfer cells, and heat transfer material porous to flow of fluid in a radial direction through the material mounted in said cells, characterized by rim and spacer structure in which the end portions of the spacers are bifurcated to define two arms at each end of each spacer, the ends of the arms bearing against the inner faces of the rims, the arms tapering toward their ends so as to tend to equalize the elastic loading along the arms; the rims have circumferential dovetail slots in their inner faces, and the arms terminate in tenons engageable in the slots.

5. A rotary regenerator matrix of the radial-flow type comprising annular coaxial mutually spaced rims, a plural number of spacers extending between and connected to the rims, the spacers being distributed around the circumference of the rims to provide a rigid structural connection between the rims and define with the rims heat transfer cells, and heat transfer material porous to flow of fluid in a radial direction through the material mounted in the said cells, characterized by rim and spacer structure in which the end portions of the spacers are bifurcated to define two arms at each end of each spacer, the ends of the arms bearing against the inner faces of the rims, the arms tapering toward their ends so as to tend to equalize the elastic loading along the arms; the rims have circumferential dovetail slots in their inner faces, the arms terminate in tenons engageable in the slots; and means operable on the spacers effective to vary the spacing of the tenons to lock and release the tenons in the slots.

6. A matrix as defined in claim 5 in which the slot dovetail is defined by a radial shoulder and one tenon has a radial offset engaging the shoulder.

References Cited by the Examiner
UNITED STATES PATENTS

| | | | |
|---|---|---|---|
| 2,579,212 | 12/1951 | Stevens et al. | 165—10 |
| 2,852,233 | 9/1958 | Hryniszols | 165—9 |
| 2,937,010 | 5/1960 | Collman et al. | 165—10 |

FOREIGN PATENTS 763,223    12/1956    Great Britain.

ROBERT A. O'LEARY, *Primary Examiner.*

A. DAVIS, *Assistant Examiner.*